(12) United States Patent
Wood

(10) Patent No.: US 8,701,404 B2
(45) Date of Patent: Apr. 22, 2014

(54) SYSTEM AND METHOD FOR ELECTRICALLY-COUPLED THERMAL CYCLE

(75) Inventor: Jonathan R. Wood, Sudbury, MA (US)

(73) Assignee: Altor Limited LC, Sudbury, MA (US)

( * ) Notice: Subject to any disclaimer, the term of this patent is extended or adjusted under 35 U.S.C. 154(b) by 157 days.

(21) Appl. No.: 12/692,406

(22) Filed: Jan. 22, 2010

(65) Prior Publication Data

US 2010/0127506 A1    May 27, 2010

Related U.S. Application Data

(62) Division of application No. 11/338,421, filed on Jan. 24, 2006, now Pat. No. 7,690,199.

(51) Int. Cl.
  *F01B 29/10* (2006.01)
  *F25B 13/00* (2006.01)

(52) U.S. Cl.
  USPC ............... 60/520; 60/524; 60/525; 290/1 R; 290/7; 62/6; 62/324.1

(58) Field of Classification Search
  USPC ................ 60/517, 518, 519, 525, 520–524; 290/1 R, 1 A, 2, 7; 62/6, 324.1–325
  See application file for complete search history.

(56) References Cited

U.S. PATENT DOCUMENTS

| | | |
|---|---|---|
| 3,675,031 A | 7/1972 | Lavigne |
| 4,215,548 A | 8/1980 | Beremand |
| 4,434,617 A | 3/1984 | Walsh |
| 4,511,805 A * | 4/1985 | Boy-Marcotte et al. .......... 290/2 |
| 4,589,380 A | 5/1986 | Coad |
| 4,642,547 A | 2/1987 | Redlich |
| 4,697,113 A | 9/1987 | Young |
| 4,761,960 A | 8/1988 | Higham et al. |

(Continued)

FOREIGN PATENT DOCUMENTS

| | | |
|---|---|---|
| EP | 0 463 818 A1 | 1/1992 |
| GB | 2023236 | 12/1979 |

(Continued)

OTHER PUBLICATIONS

International Preliminary Report on Patentability, International Application PCT/US2007/000313, 8 pages, Aug. 7, 2008.

(Continued)

*Primary Examiner* — Hoang Nguyen
(74) *Attorney, Agent, or Firm* — Hamilton, Brook, Smith & Reynolds, P.C.

(57) ABSTRACT

In one embodiment according to the invention, there is provided a method for generating electrical energy using a thermal cycle of a working gas. The method comprises using the motion of a piston in a cylinder, containing the working gas performing the thermal cycle, to electromagnetically induce current in an electrical circuit coupled to the cylinder; using the electrical circuit to store the electrical energy, produced by the current induced in the electrical circuit, in an electrical storage device; and using the electrical energy stored in the electrical storage device to electromagnetically provide a motive force to the piston. Cyclically using the electrical circuit to store the electrical energy and using the stored energy to provide a motive force to the piston effect a net positive average power transfer into the electrical storage device over the course of the thermal cycle.

22 Claims, 15 Drawing Sheets

(56) References Cited

U.S. PATENT DOCUMENTS

| | | | |
|---|---|---|---|
| 4,888,951 A * | 12/1989 | Beale | 60/520 |
| 4,926,639 A | 5/1990 | Mitchell | |
| 5,040,372 A | 8/1991 | Higham | |
| 5,329,768 A | 7/1994 | Moscrip | |
| 5,752,385 A | 5/1998 | Nelson | |
| 5,775,273 A | 7/1998 | Beale | |
| 6,198,256 B1 | 3/2001 | Miyazaki et al. | |
| 6,385,972 B1 | 5/2002 | Fellows | |
| 6,541,875 B1 | 4/2003 | Berlinger et al. | |
| 6,694,731 B2 | 2/2004 | Kamen et al. | |
| 6,968,688 B2 | 11/2005 | Gimsa | |
| 7,152,404 B2 * | 12/2006 | Francois et al. | 60/525 |
| 7,191,738 B2 | 3/2007 | Shkolnik | |
| 7,200,994 B2 * | 4/2007 | Chertok | 60/518 |
| 7,318,506 B1 | 1/2008 | Meic | |
| 7,690,199 B2 | 4/2010 | Wood | |
| 7,777,357 B2 | 8/2010 | Hyde et al. | |
| 7,845,317 B2 | 12/2010 | Max et al. | |
| 7,856,714 B2 | 12/2010 | Hyde et al. | |
| 7,950,356 B2 | 5/2011 | Hyde et al. | |
| 8,196,402 B2 | 6/2012 | Wood | |
| 8,432,047 B2 | 4/2013 | Schilling | |
| 2003/0121259 A1 | 7/2003 | Conrad | |
| 2005/0109295 A1 | 5/2005 | Kaneko et al. | |
| 2007/0157894 A1 | 7/2007 | Scuderi et al. | |
| 2008/0036312 A1 | 2/2008 | Max et al. | |
| 2008/0098972 A1 | 5/2008 | Elwart | |
| 2009/0090334 A1 | 4/2009 | Hyde et al. | |
| 2009/0091138 A1 | 4/2009 | Hyde et al. | |
| 2009/0091195 A1 | 4/2009 | Hyde et al. | |
| 2009/0094827 A1 | 4/2009 | Hyde et al. | |
| 2010/0115941 A1 | 5/2010 | Wood | |
| 2010/0115942 A1 | 5/2010 | Wood | |
| 2010/0187031 A1 | 7/2010 | Waszak et al. | |
| 2010/0289263 A1 | 11/2010 | Hyde et al. | |
| 2011/0174271 A1 | 7/2011 | Wood | |

FOREIGN PATENT DOCUMENTS

| | | |
|---|---|---|
| JP | 64003235 | 1/1989 |
| JP | 04-262025 | 9/1992 |
| JP | 2001241302 | 9/2001 |
| JP | 2001289119 | 10/2001 |
| JP | 2005155345 | 6/2005 |
| WO | 0188353 | 11/2001 |
| WO | WO 01/88353 A1 | 11/2001 |
| WO | 03072909 | 9/2003 |
| WO | 2005021966 | 3/2005 |
| WO | 2010104601 | 9/2010 |

OTHER PUBLICATIONS

International Search Report and Written Opinion of PCT/US2011/021695 dated Jun. 16, 2011.
Written Opinion and International Search Report, International Application PCT/US2007/000313, 15 pages, Oct. 11, 2007.
Office Action dated Aug. 23, 2011 for U.S. Appl. No. 12/692,432.
Office Action dated Nov. 21, 2011 for U.S. Appl. No. 12/692,440.
International Preliminary Report on Patentability and Written Opinion of PCT/US2011/021695 dated Aug. 2, 2012.
Office Action made Final, dated Feb. 3, 2012, issued in U.S. Appl. No. 12/692,440.
Office Action made Final, dated Feb. 3, 2012, issued in U.S. Appl. No. 12/692,432.
Notice of Allowance, dated Apr. 9, 2012, U.S. Appl. No. 12/692,432.
Office Action for U.S. Appl. No. 13/009,252, dated Aug. 15, 2013.
Office Action dated May 30, 2013 for U.S. Appl. No. 12/692,440.
Notice of Allowance dated Dec. 27, 2013 for U.S. Appl. No. 12/692,440 "System and Method for Electrically-Coupled Thermal Cycle."
Notice of Allowance dated Dec. 17, 2013 for U.S. Appl. No. 13/009,252 "System and Method for Electrically-Coupled Heat Engine and Thermal Cycle."

* cited by examiner

SYSTEM AND METHOD FOR ELECTRICALLY-COUPLED THERMAL CYCLE

RELATED APPLICATION

This application is a divisional of U.S. application Ser. No. 11/338,421, filed Jan. 24, 2006 now U.S. Pat. No. 7,690,199, the entire teachings of which application are incorporated herein by reference.

BACKGROUND OF THE INVENTION

A thermal cycle of a heat engine that employs a quantity of gas as an operating medium can be described by reference to a pressure-volume (P-V) diagram. FIGS. 1 and 2 show P-V diagrams for two well-known thermal cycles, the Carnot cycle (FIG. 1), and the ideal Sterling cycle (FIG. 2).

The net energy delivered from one thermal cycle is the area of the loop swept out by the operating path in the P-V plane. In the course of each cycle, energy is delivered by the engine for part of the cycle, and is absorbed by the engine for the remainder of the cycle. For some parts of some cycles, energy is neither stored nor delivered. For instance, in the ideal Sterling cycle, mechanical energy is neither absorbed nor delivered during those parts of the cycle where the trajectory is parallel to the P-axis.

By necessity, part of the system used for extracting a net positive average power output must include a device for storing and returning energy out of and into the heat engine, on a cyclic basis. In conventional heat engines, this cyclic energy storage is accomplished by mechanical means, for example via the rotational inertia of a crankshaft with flywheel attached.

SUMMARY OF THE INVENTION

It is desirable to be able to convert heat into electricity by means of a method in which the equipment is reliable, efficient, quiet, free of vibration, and capable of operating from a variety of fuels.

It is also desirable to be able to use electricity to effect heat transfer by means of equipment with such attributes.

To achieve these and other objectives, an embodiment of the invention provides a method for generating electrical energy using a thermal cycle of a working gas. The method comprises using the motion of a piston in a cylinder, containing the working gas performing the thermal cycle, to electromagnetically induce current in an electrical circuit coupled to the cylinder. The electrical circuit is used to store the electrical energy, produced by the current induced in the electrical circuit, in an electrical storage device; and the electrical energy stored in the electrical storage device is used to electromagnetically provide a motive force to the piston. Cyclically using the electrical circuit to store the electrical energy and using the stored energy to provide a motive force to the piston effect a net positive average power transfer into the electrical storage device over the course of the thermal cycle.

The electrical circuit may comprise an electronic power converter, and the method may further comprise using the electronic power converter to perform closed-loop electronic control of the motion of the piston. The electronic power converter may perform the closed-loop control based on electrical signals related to the state of the working gas. At least one of a temperature sensor, a pressure sensor, and a position sensor may be used to deliver the electrical signals related to the state of the working gas to the electronic power converter.

The thermal cycle may approximate a Sterling cycle, a Carnot cycle, an Otto cycle, or another thermal cycle. The thermal cycle may receive heat from external combustion, or the working gas may be cycled through an internal combustion cycle.

Compression and expansion of the working gas between a first piston and a second piston may be used to perform the thermal cycle. The electrical circuit may comprise a set of windings coupled to the cylinder, and the method may comprise using the motions of a first permanent magnet attached to the first piston and a second permanent magnet attached to the second piston to electromagnetically induce current in the set of windings. Further, the motions of the first piston and the second piston may be used to move the working gas along the cylinder to effect successive heat transfer with a heating zone and a cooling zone of the cylinder.

At least part of the shaft of the first piston may move concentrically within a shaft of the second piston. The electronic power converter may be used to control timing of the thermal cycle by controlling the motions of the first piston and the second piston; including by controlling the motions of the first piston and the second piston such that the working gas moves between a heating zone, a cooling zone, and a neutral zone of the cylinder. A thermal shade may be attached to the first piston or the second piston to insulate non-working gas within the cylinder; and a paddle may be attached to the first piston or the second piston to create turbulence in the working gas. An external flow return may be used to flow non-working gas between a first end zone and a second end zone of the cylinder. The first piston and the second piston may be mounted around a common centering shaft.

Two cylinders operating according to the invention may be operated in axial opposition to each other. Similarly, four cylinders may be operated in a bundle with parallel axes of the cylinders, two of the cylinders being operated antiparallel to the other two cylinders of the bundle.

In another embodiment according to the invention, there is provided a method for powering a heat pump using electrical energy, the heat pump performing a thermal cycle. The method comprises using electrical energy stored in an electrical storage device to electromagnetically provide a motive force to a piston in a cylinder containing the working gas performing the thermal cycle. The motion of the piston is used to electromagnetically induce current in an electrical circuit coupled to the cylinder; and the electrical circuit is used to store the electrical energy, produced by the current induced in the electrical circuit, in the electrical storage device. Cyclically using the stored energy to provide the motive force to the piston and using the electrical circuit to store the electrical energy effect a net positive average power transfer out of the electrical storage device over the course of the thermal cycle. Similar methods as those used with the method for generating electrical energy, above, may be used with the method for powering a heat pump.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
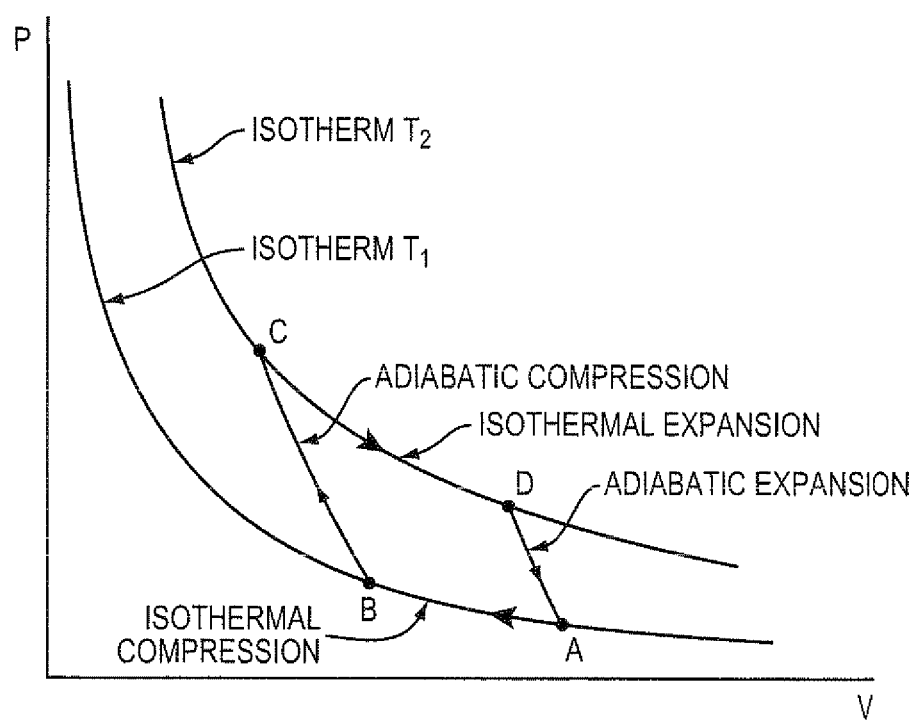
FIG. 1 shows a pressure-volume diagram for a Carnot cycle, known in the art.

Rotational inertia has been the method of choice for cyclic energy storage in heat engines since their development in the eighteenth century. Thus, the devices used for cyclically storing and returning energy out of and into the heat engine are typically mechanical. For example, an engine may use the rotational inertia of a crankshaft with flywheel attached for cyclical energy storage. In this way, conventional heat engines can be said to use mechanically-coupled thermal cycles.

However, in such a mechanically-coupled thermal cycle the motion of the pistons is constrained by the motion of the crankshaft. The pistons therefore cannot move in a manner that allows the state of the working gas to closely follow the desired P-V cycle. The relative amounts of time devoted to each segment of the cycle are fixed by the mechanical constraints on the motion of the flywheel. Moreover, mechanically-coupled heat engines are constrained in their reliability and efficiency, the amount of noise and vibration they generate, and their ability to operate from a variety of fuels.

In order to improve on these characteristics, an embodiment according to the invention uses an electricity storage device to accommodate the cyclic flow of energy from a thermal cycle. The thermal cycle can therefore be described as electrically-coupled. An embodiment uses direct electric drive of pistons by means of electromagnetic shear.

Electricity storage devices suitable for this application include, for example, capacitors, batteries, and (if available) superconducting coils. Direct electric drive using electromagnetic shear may be accomplished with the use of permanent magnets attached to each piston assembly, and with the use of controlled electric currents in coils or windings to provide force to, or electromagnetic induction from, the permanent magnets.

Embodiments of an electrically-coupled thermal cycle may be used for the generation of electricity from a thermal cycle, such as to charge a battery using the external or internal combustion of a gas; or for electrical powering of a thermal cycle, such as using a battery or other source of direct current to power a heat pump.

In accordance with the invention, power electronic circuits can be built which permit the motion of the pistons to be controlled so as to follow as closely as possible any desired path in the P-V plane. The necessary energy cycling required to extract average power from a heat engine can be effected via electrical energy storage. The use of electric coupling in this manner allows for variation of the amounts of time spent in each segment of a P-V cycle, thereby allowing for high thermal cycle efficiencies.

Therefore, by comparison with prior systems in which energy was cyclically stored mechanically, an embodiment according to the invention uses electrical storage of cyclical energy flow. In addition, use of electrical circuitry allows closed-loop electrical control of piston motion.

In the prior art, refrigeration devices are known that are driven by electronic linear drive motors, such as in U.S. Pat. No. 4,761,960 of Higham et al.; U.S. Pat. No. 4,697,113 of Young; and U.S. Pat. No. 5,040,372 of Higham. Further, such linear drive motors may be battery-powered, with the delivery of current from the battery being electrically controlled, as in U.S. Pat. No. 5,752,385 of Nelson and U.S. Pat. No. 4,434,617 of Walsh. Also, free-piston hydraulic engines are known, such as in U.S. Pat. No. 4,215,548 of Beremand.

However, an embodiment according to the present invention is fundamentally different from such previously known systems because it employs electrical storage of cyclical energy flows to and from the thermal cycle. Thus, within a thermal cycle, an embodiment according to the invention cycles energy into and out of an electrical storage device that is electrically coupled to a cylinder containing the piston. By contrast, such previously known systems did not use electrical storage of cyclical energy flow. Some such prior systems may instead use a form of mechanical resonance for cyclical energy flow. For example, in U.S. Pat. No. 4,434,617, a mechanical resonance is used between the mass of the piston and the compressed end-zone gas, which acts as a spring, for cyclical energy flow. Although a synchronized electrical drive is used to assist and maintain the mechanical resonance, the system does not use an electrical storage device to absorb the cyclical energy flow from the thermal cycle. Such systems therefore do not allow the potential improvements in thermal efficiency provided by using electrical storage of cyclical energy flows from a thermal cycle, and electronic control of the cyclical energy flows, according to an embodiment of the invention.

A description of preferred embodiments of the invention follows.

Figures 3A, 3B:
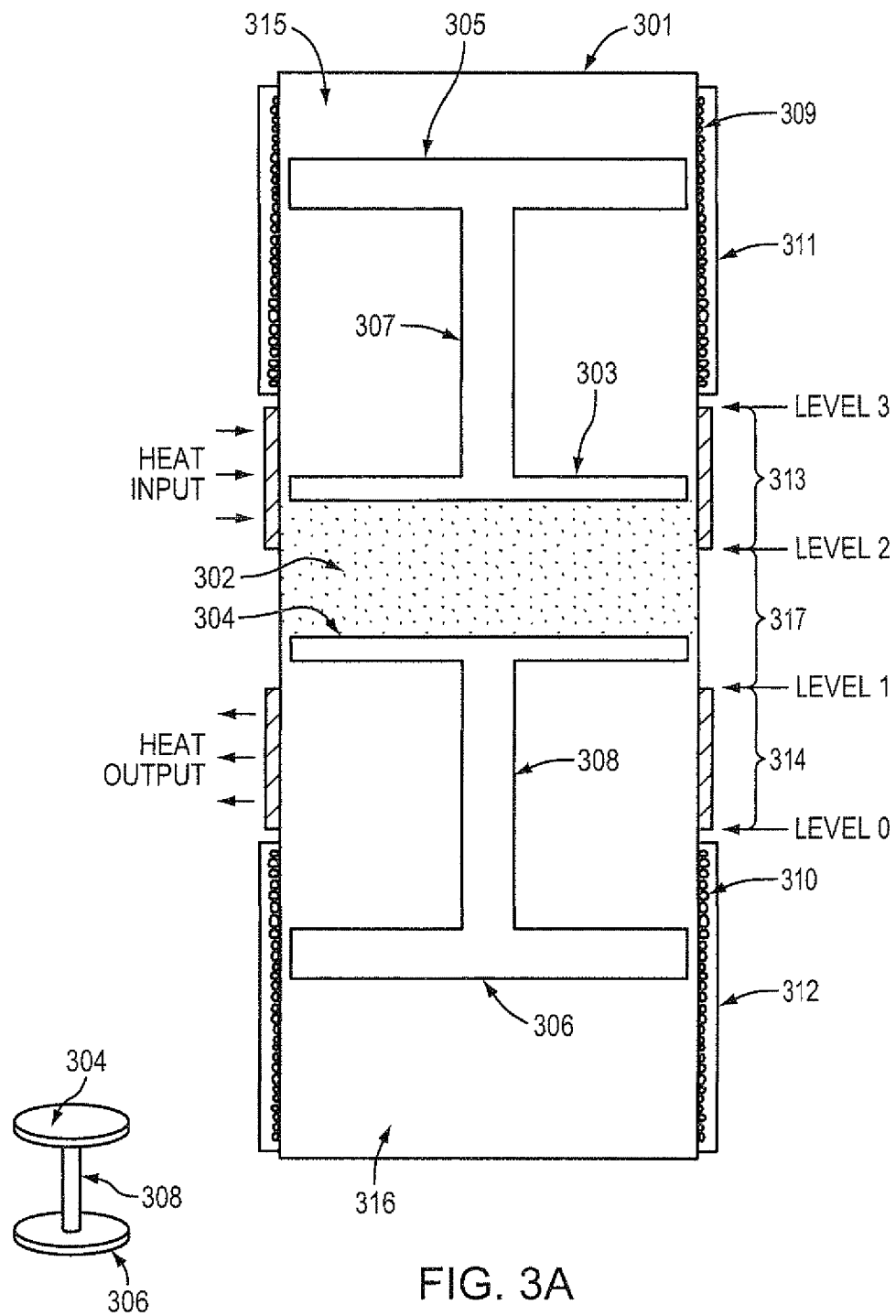
FIG. 3A shows an arrangement of coils, magnets, and pistons for an external combustion cylinder according to an embodiment of the invention.
FIG. 3B shows a separate view of a piston for the embodiment of FIG. 3A.

FIGS. 3A and 3B show an arrangement of coils, magnets, and pistons for an external combustion generator according to an embodiment of the invention. In the cross-sectional view of FIG. 3A, a closed gas containment cylinder 301 contains a body of gas, a portion of which becomes the working gas 302. The working gas 302 is the subset of the total gas within the cylinder 301 that lies between two pistons 303 and 304, which slide within the cylinder 301. The pistons 303 and 304 maintain a tolerably good gas seal with the inner wall of the cylinder 301 without creating undue friction. Conventional piston rings, for example, may be employed for this purpose. The cylinder 301 will typically be of circular cross section, but may have other cross sectional shapes. The working gas 302 may be any gas suitable for the purpose, such as air, nitrogen, helium, or hydrogen.

As shown in FIG. 3B, each of the two pistons 303 and 304 is in the form of a plate. Attached centrally and perpendicular to each plate 303 and 304 is a shaft 307 and 308 attached at its other end to a permanent magnet plate 305 and 306. The permanent magnet plates 305 and 306 contain permanent magnets within them, suitably arranged, together with magnetic path material such as iron or a suitable grade of steel. The arrangement of the permanent magnets and magnetic path material is such as to produce magnetic flux emanating from the outer edges of the permanent magnet plates 305 and 306, which cuts through the drive windings 309 and 310 surrounding the cylinder 301 (FIG. 3A). The cylinder 301 is made of nonmagnetic materials. A plurality of such materials may be employed to construct cylinder 301. For example, a material such as aluminum may be used for regions such as 313 and 314, where heat flow is required; and a material such as ceramic or fiberglass may be used for regions such as 317, where heat flow is not required. Surrounding the drive windings 309 and 310 are magnetic field return paths 311 and 312 made of magnetic path material.

Also surrounding the cylinder 301 are two heat transfer zones 313 and 314 made of thermally conductive material such as copper or an aluminum alloy. A heating zone 313 accepts heat from an external heat source, for example a flame or solar collector, and transfers that heat into the working gas 302 at an appropriate time, as described below. Likewise, a cooling zone 314 extracts heat from the working gas 302 at an appropriate time, also described below. The heat transfer zones 313 and 314 are separated from each other by a thermally insulated neutral zone 317. The three zones 313, 314, and 317 are shown in the accompanying figures to be of comparable lengths, which is not necessarily required, but may be advantageous with regard to optimization of overall power output.

Figure 4:
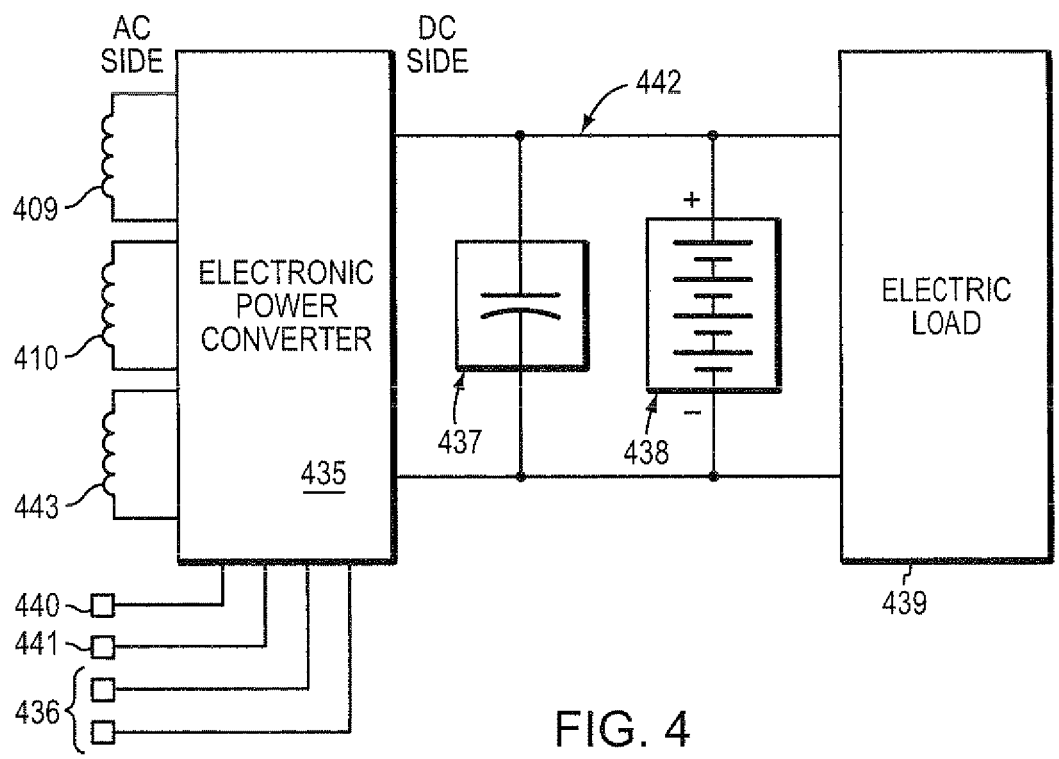
FIG. 4 is a schematic diagram of electrical components that are coupled to the external combustion cylinder arrangement of FIGS. 3A-3B.

FIG. 4 is a schematic diagram of electrical components that are coupled to the external combustion cylinder arrangement of FIGS. 3A-3B, in order to accommodate the cyclic flow of energy from the thermal cycle in accordance with an embodiment of the invention. Drive windings 409, 410, 443, which are the drive windings depicted as 309, 310 of FIG. 3A, connect to an electronic power converter 435. FIG. 4 shows three isolated windings 409, 410, 443 for illustrative convenience, but any number of separate windings may be employed, as necessary. Also connected to the electronic power converter 435 are signals from position sensors 436, a temperature sensor 440, and a pressure sensor 441. It will be appreciated that any appropriate number of such position, temperature, and pressure sensors may be employed. The position sensors 436 give the electronic power converter 435 the information it needs to know the exact location of each piston at any instant in time. The temperature sensor 440 and pressure sensor 441 inform the electronic power converter 435 of the state of the working gas 302 at any instant.

Electronic power converter 435 is connected to a DC Bus 442, to which is connected a capacitor 437 and/or a battery 438, and an electric load 439. The electric load 439 may be disconnected from the DC Bus 442 when not required, while the electronic power converter 435 continues to charge the battery 438. Suitable batteries for battery 438 include lithium or other modern types of batteries configured for energy cycling applications, with better performance gained by lithium or other types of batteries capable of cycling energy at a rate of a few cycles per second or faster.

During operation of the system, the electronic power converter 435 of FIG. 4 controls the flow of electric current into and out of the windings 309 and 310 of FIG. 3A such that pistons 303 and 304 move up and down within the cylinder 301 to cause the working gas 302 to follow a desired P-V cycle. The capacitor 437 and battery 438 act as the energy reservoir for the system, and absorb the cyclic energy variations which are integral to the cycles of heat engines. The electronic power converter 435 stores little or no energy, and transfers power between the DC Bus 442 and the windings 309 and 310 in a highly efficient manner.

In this way, the embodiment of FIGS. 3A-4 provides an electrically-coupled external combustion generator. Energy released from external combustion is transferred into the cylinder 301 through heating zone 313, a pressure-volume cycle is produced in working gas 302, and cyclic energy storage is performed by the electrical circuitry of FIG. 4. In one application, for example, the external combustion of a gas may therefore be used to store electrical charge in battery 438 without using any moving parts other than the pistons 303 and 304.

Figure 5:
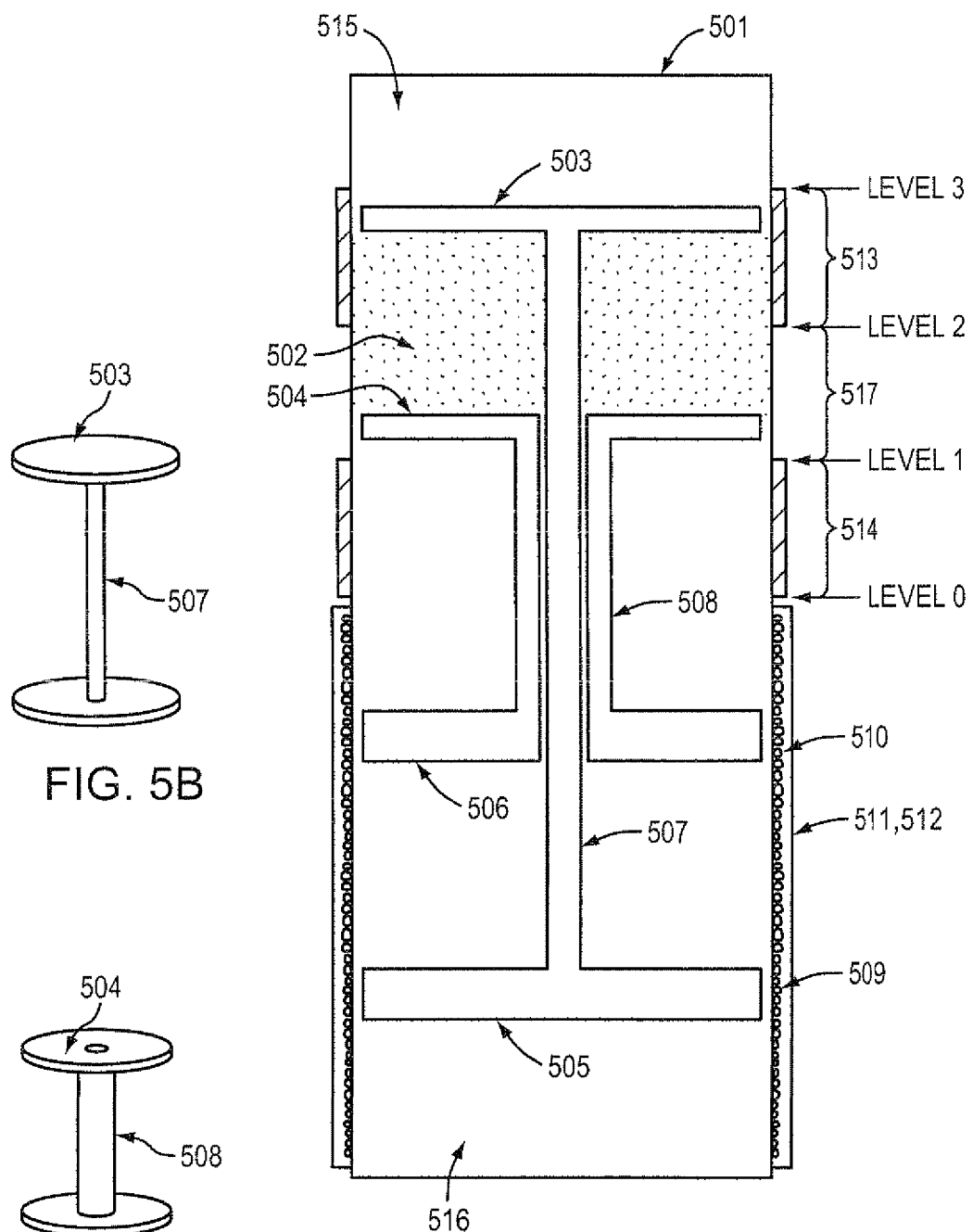
FIG. 5A illustrates an alternative embodiment that may be used in place of the mechanical arrangement of FIG. 3A, in accordance with an embodiment of the invention.
FIGS. 5B and 5C show separate views of pistons for the embodiment of FIG. 5A.

FIGS. 5A-5C illustrate an alternative embodiment that may be used in place of the mechanical arrangement of FIGS. 3A-3B, wherein the drive windings 509 and 510 are placed adjacent to each other and away from the heating zone 513. By placing the permanent magnet plates 505 and 506 away from the heating zone 513, this arrangement simplifies the design task of keeping the permanent magnets cool. Neodymium-iron permanent magnet material loses its magnetism when subjected to high temperatures, and is limited to working temperatures typically no higher than 150 to 200 C. As shown in FIG. 5A, the shaft 507 of a longer piston assembly (shown separately in FIG. 5B) lies concentrically within the shaft 508 of a shorter piston assembly (shown separately in FIG. 5C). The mechanical fit between these two shafts 507 and 508 is such as to give a tolerably good gas seal between them without creating undue friction. The inner shaft 507, which connects piston 503 to its permanent magnet plate 505, is constructed to give minimal heat conduction from the hot upper end 503 to the permanent magnet plate 505 and to the shaft 508 surrounding it. This may be effected by using a thermally insulating material such as ceramic for shaft 507, possibly with a metallic core for strength. The drive windings 509 for the longer piston assembly 503 are located further away from the cooling zone 514 than the drive windings 510 for the shorter piston assembly 504. In FIG. 5A (unlike with plates 305 and 306 in FIG. 3A), permanent magnet plate 506 is located above permanent magnet plate 505, because piston assembly 503 is longer than piston assembly 504. The operation of the heat engine depicted in FIG. 5A is just as described above for the heat engine depicted in FIG. 3A, with similar electrical coupling to circuitry such as that of FIG. 4.

Figure 2:
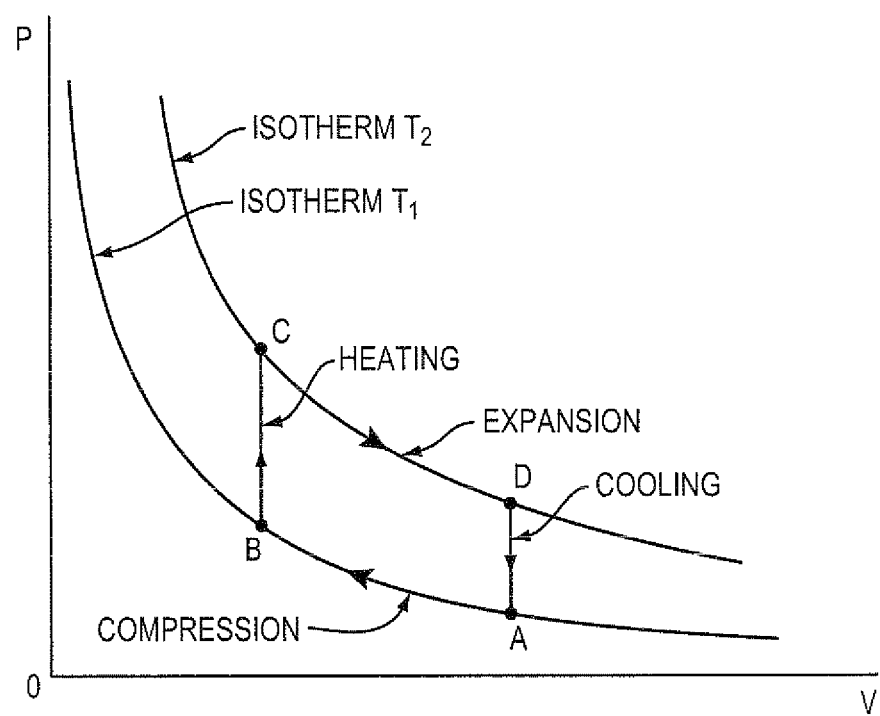
FIG. 2 shows a pressure-volume diagram for an ideal Sterling cycle, known in the art.
Figure 6:
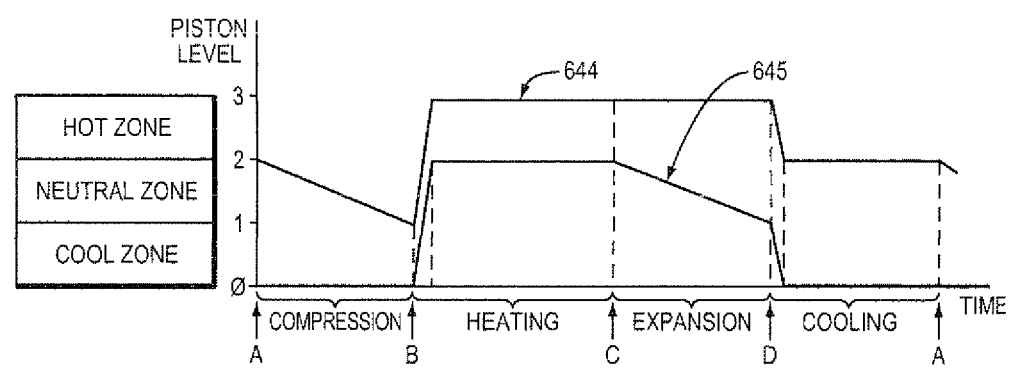
FIG. 6 is a timing diagram for the heat engines of FIGS. 3A and 5A when operated as electricity generators per the Sterling cycle depicted in FIG. 2, in accordance with an embodiment of the invention.

FIG. 6 is a timing diagram for the heat engines of FIGS. 3A and 5A when operated as electricity generators per the Sterling cycle depicted in FIG. 2, in accordance with an embodiment of the invention. Curve 644 is the piston position profile for piston 303, 503, and curve 645 is the piston position profile for piston 304, 504, for a repeating cycle A-B-C-D-A. The piston positions are indicated by position levels 0 through 3 on the y-axis of FIG. 6, which correspond to cylinder positions indicated in FIGS. 3A and 5A. The cooling zone 314, 514 extends from position level 0 to level 1; the neutral zone 317, 517 extends from position level 1 to level 2; and the heating zone 313, 513 extends from position level 2 to level 3. Although FIG. 6 shows the amount of time spent in each of the four segments of the thermal cycle as approximately equal, it is to be understood that the duration of each segment can be varied independently of the others, thereby allowing for power output variation and efficiency maximization. In varying the duration of the segments, there is an inherent conflict between the objectives of maximizing power output and maximizing efficiency; either objective can be satisfied, but not both simultaneously.

Between times A and B of FIG. 6 the working gas 302, 502 is compressed at constant temperature T1. In the A-B path, piston 304, 504 is held at position Level 0 (shown on the y-axis of FIG. 6, and in FIGS. 3A and 5A) as shown by curve 645, while piston 303, 503 is moved from position Level 2 to Level 1 as shown by curve 644, thereby compressing the working gas 302, 502. The motion 644 of piston 303, 503 for this segment is depicted as having a straight-line shape in FIG. 6, although in practice the motion will typically be nonlinear.

Between times B and C of FIG. 6, the working gas 302, 502 is held at constant volume and heated to temperature T2. In the B-C path, both pistons initially move quickly together such that piston 303, 503 is moved from position Level 1 to Level 3, while piston 304, 504 is moved from position Level 0 to Level 2, as indicated by curves 644 and 645. For the duration of the B-C time segment, piston 304, 504 is held at position Level 2 (curve 645), and piston 303, 503 is held at position Level 3 (curve 644).

Between times C and D of FIG. 6, the working gas 302, 502 expands at constant temperature T2. In the C-D path, piston 303, 503 is held at position Level 3 (curve 644), while piston 304, 504 is moved from position Level 2 to Level 1 (curve 645). The motion of piston 304, 504 for this segment is depicted as having a straight-line shape in curve 645 of FIG. 6, although in practice the motion will typically be nonlinear.

Between times D and A of FIG. 6, the working gas 302, 502 is again held at constant volume and is cooled to temperature T1. In the D-A path, both pistons initially move quickly together such that piston 303, 503 is moved from position Level 3 to Level 2 (curve 644), while piston 304 is moved from position Level 1 to Level 0 (curve 645). For the duration of the D-A time segment, piston 304, 504 is held at position Level 0 (curve 645), and piston 303, 503 is held at position Level 2 (curve 644).

Examination of the timing diagram of FIG. 6 shows that there are portions of the cycle wherein the pistons are stationary. These regions may afford an opportunity for efficiency improvement, whereby a mechanical means is used to hold each piston in its appointed place during a stationary portion of the cycle rather than relying on the flow of electric current in the drive windings, with its attendant ohmic losses. For instance, during the compression region A-B in FIG. 6, piston 304, 504 could be prevented from moving even lower than position Level 0 by a mechanical impediment. The state of pressure in the end zones 315/515, 316/516 will be a factor in the implementation of this technique, and the design of the end zones may need to be modified accordingly.

Such mechanical hard stops could, in principle, take the form of a mechanical barrier, or they may be effected by means of permanent magnets (and/or magnetic poles) attached rigidly either to the cylinder 301, 501 and/or to the piston assemblies. If a mechanical barrier is used, the power electronics can control the motion of the piston as it approaches the barrier so as to effect a "soft landing". A soft, springy material attached to the barrier or to the piston may assist with ensuring a soft landing. Permanent magnets would have the advantage of maintaining a physical impediment to further motion, without the practical concerns of physical contact associated with mechanical barriers. The permanent magnets can be used either in the attraction mode or in the repulsion mode. If they are used in the attraction mode, the control electronics will need to provide an excess impulse of current in order to break the piston free from its magnetic confinement at the end of the stationary period.

Figure 12:
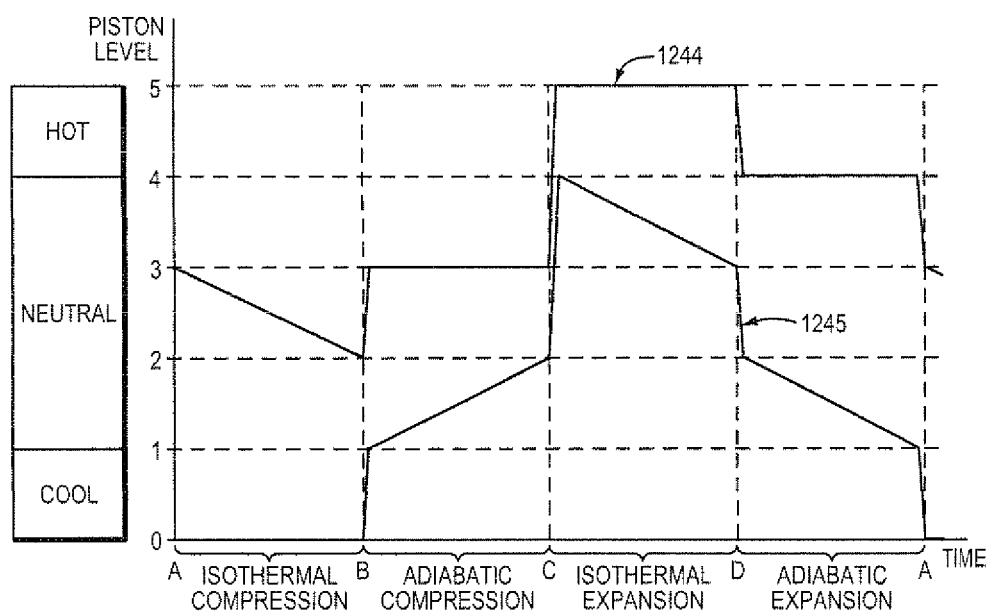
FIG. 12 is a timing diagram for the heat engines of FIGS. 3A and 5A when operated as electricity generators per the Carnot cycle depicted in FIG. 1, in accordance with an embodiment of the invention.

Although a Sterling cycle has been described above, the general arrangement illustrated by FIGS. 3A-5C can be used for other types of thermal cycle, including one which approximates the Carnot cycle of FIG. 1. Such a Carnot Engine may operate, for example, via the timing diagram of FIG. 12, which applies to a physical arrangement in which the length of the neutral zone 317, 517 is three times that of the heating 313, 513 and cooling 314, 514 zones. In FIG. 12, curve 1244 is the piston position profile for piston 303, 503, and curve 1245 is the piston position profile for piston 304, 504, for a repeating cycle A-B-C-D-A. Because of the extended length of the neutral zone 317, 517, the position levels are shown ranging from level 0 to level 5, with the cooling zone 314, 514 extending from level 0 to level 1, the neutral zone 317, 517 extending from level 1 to level 4, and the heating zone 313, 513 extending from level 4 to level 5. Time interval A-B corresponds to isothermal compression, interval B-C corresponds adiabatic compression, interval C-D corresponds to isothermal expansion, and interval D-A corresponds to adiabatic expansion.

While the embodiments of FIGS. 3A-5C have been described as generators, by which heat is converted to electricity, it is also possible to use an electrically-coupled thermal cycle in accordance with an embodiment of the invention to create an electrically-powered heat pump. In this case, the embodiments of FIGS. 3A-5C are essentially operated in reverse: energy stored in electrical circuitry such as that of FIG. 4 is cycled in and out of a cylinder 301, 501 via windings 309, 509 and 310, 510, so that the pistons 303-304 and 503-504 perform a heat pump cycle. Such a heat pump may be used to generate heat or to receive heat, which can be transferred to or from an external object through heating and cooling zones 313-314 and 513-514.

Figure 7:
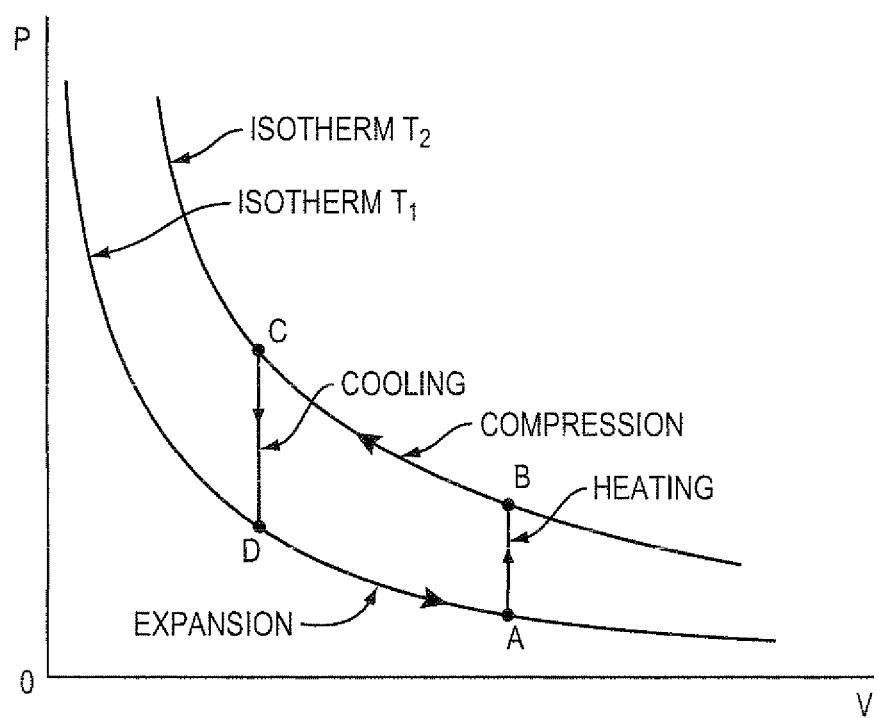
FIG. 7 is a P-V diagram for a Sterling cycle heat pump operated in accordance with an embodiment of the invention.
Figure 8:
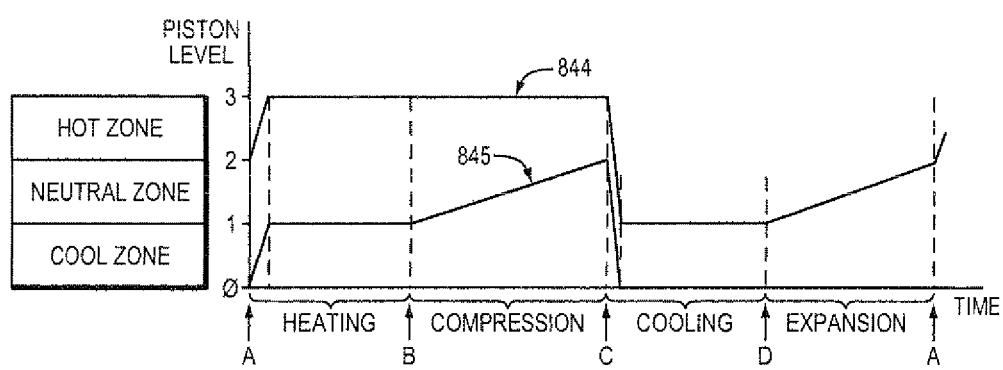
FIG. 8 is a timing diagram for the Sterling cycle heat pump of FIG. 7.

FIG. 7 shows a P-V diagram for such a Sterling cycle heat pump (i.e., a refrigerator) operated in accordance with an embodiment of the invention. It can be seen that the path followed is that of FIG. 2, taken in reverse. FIG. 8 gives the corresponding timing diagram, which can be understood by reference to the similar preceding explanation for FIG. 6. Curve 844 is the piston position profile for piston 303, 503, and curve 845 is the piston position profile for piston 304, 504, for a repeating cycle A-B-C-D-A. The piston positions are indicated by position levels 0 through 3 on the y-axis of FIG. 8, which correspond to cylinder positions indicated in FIGS. 3A and 5A. The cooling zone 314, 514 extends from position level 0 to level 1; the neutral zone 317, 517 extends from position level 1 to level 2; and the heating zone 313, 513 extends from position level 2 to level 3.

Figure 9:
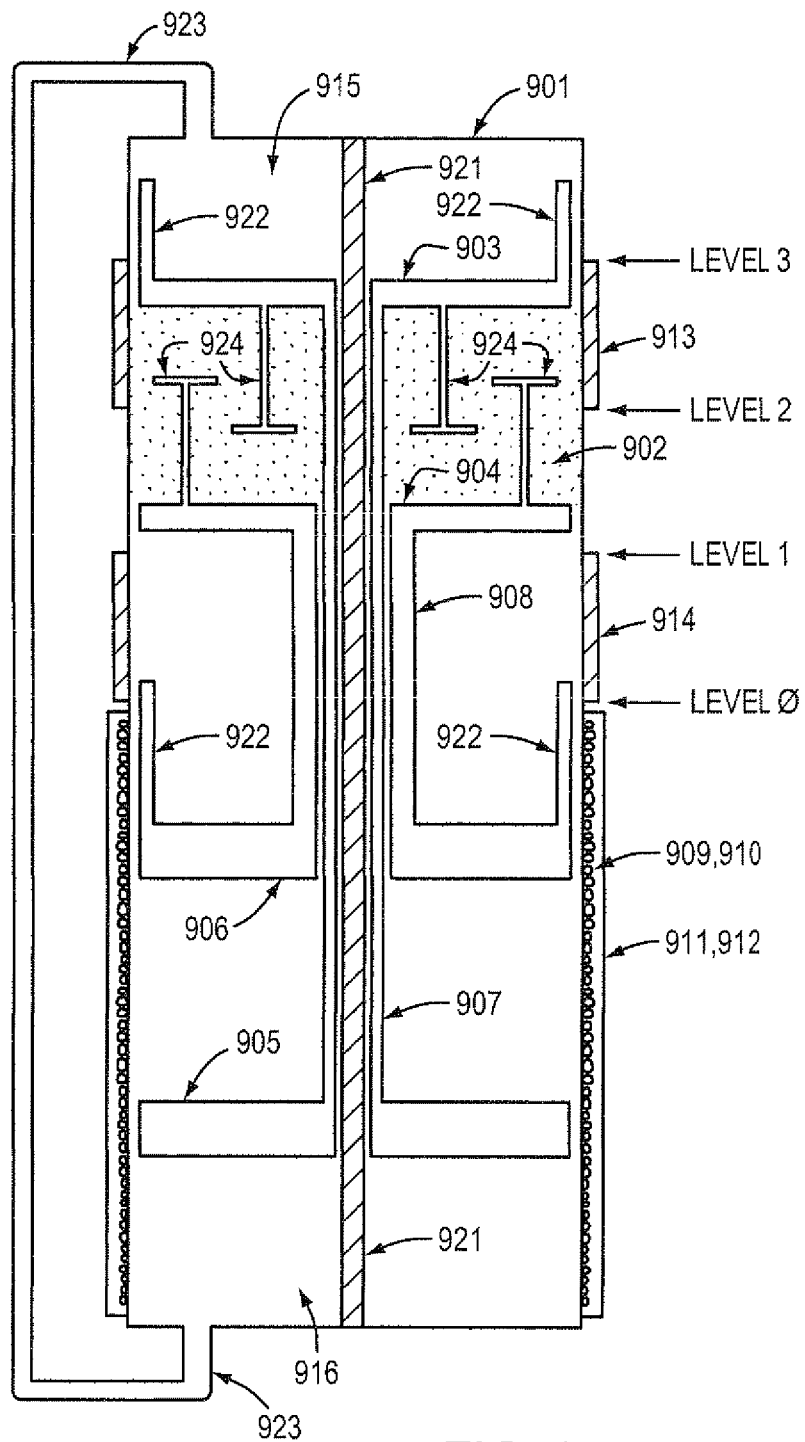
FIG. 9 illustrates an alternative embodiment that may be used in place of the mechanical arrangements of FIGS. 3A-3B and 5A-5C, in accordance with an embodiment of the invention.

FIG. 9 shows an alternative embodiment that may be used in place of the mechanical arrangements of FIGS. 3A-3B and 5A-5C. A centering shaft 921 is located centrally and within the shaft 907 of piston assembly 903, which in turn is located within the shaft 908 of piston assembly 904. Again, the mechanical fit between the shafts 921, 907, and 908 is such as to give a tolerably good gas seal between them without creating undue friction. Centering shaft 921 holds both piston assemblies 903, 904 centered within the cylinder 901, so that they do not cling to one side of the cylinder via magnetic attraction, thereby causing excess friction and compromised gas sealing. The centering shaft 921 therefore assists to improve system efficiency.

In an alternative embodiment according to the invention, portions of centering shaft 921 may be made of magnetic path material encircled by field coils, to create an electromagnet, thereby providing a means for the elimination of permanent magnets in the plates 305 and 306 of FIG. 3A. For example, using field coils wound around each end of such a magnetic centering shaft 921, two electromagnets may be created, to replace the functional role of permanent magnets in plates 305 and 306. Plates 305 and 306 are then made of magnetic path material.

Returning to the embodiment of FIG. 9, thermal shades 922 can be fitted to, or made part of, the pistons 903 and 904. The function of these thermal shades 922 is to impede the flow of heat through the heating 913 and cooling 914 zones during appropriate portions of the heat cycle. The thermal shades 922 are made of thermally insulating material, and are located close to, but not in contact with, the inside walls of the cylinder 901. The thermal shades 922 extend around the entire inner perimeter of the inside walls of the cylinder 901. They impede the flow of heat via radiation, conduction, and convection into and out of the non-working gas within the cylinder 901, thereby improving system efficiency.

An external flow return 923 is a tube allowing non-working gas to flow from the upper end zone 915 to the lower end zone 916 to permit pressure equalization, which may be necessary to improve system efficiency. An alternative means for achieving this pressure equalizing gas flow, not shown in FIG. 9, is to provide an internal flow return in the form of a passageway inside the centering shaft 921, which then takes the form of a hollow tube. The volume of the upper end zone 915 and lower end zone 916 relative to the size of the working region (that is, the region between piston position levels 0 and 3) may need to be adequately large in order to maintain system efficiency, by eliminating the requirement for excessive forces to compress the gas in the end zones 915 and 916. To this end, the external flow return 923 may include one or more expansion chambers (not shown in FIG. 9) along its length.

In order to improve the rate of heat transfer through the walls of the heating zone 913 into the working gas 902, paddles 924 may be attached to the pistons 903 and 904. These paddles 924 stir the working gas 902 as the pistons 903 and 904 move relative to each other, thereby causing turbulence and motion of the working gas 902, and helping improve system efficiency. The paddles 924 also improve the rate of heat transfer from the working gas 902 through the walls of the cooling zone 914. The paddles 924 may have a variety of shapes, consistent with not making contact with each other or with the other piston.

Figure 10:
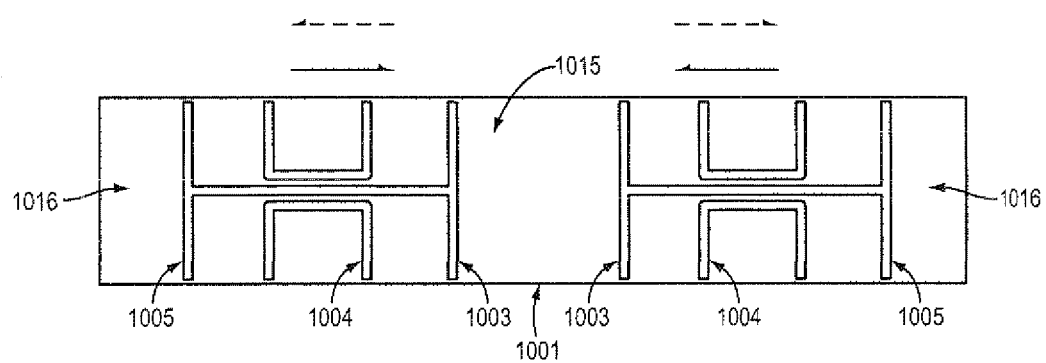
FIG. 10 shows an axially opposed heat engine according to an embodiment of the invention.
Figure 11A:
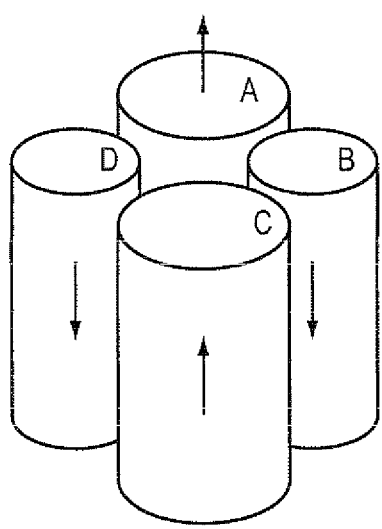
FIGS. 11A and 11B illustrate an arrangement of four of the cylinder assemblies of the type shown in FIG. 5A placed side-by-side with parallel central axes, according to an embodiment of the invention.
Figure 11B:
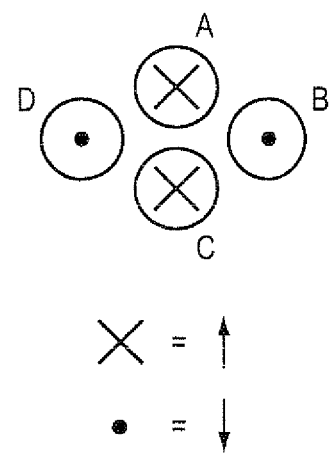

FIGS. 10-11B illustrate methods for reducing vibrations in a power conversion system according to an embodiment of the invention. In FIG. 10, two of the cylinder assemblies of the type shown in FIG. 5A (or any other cylinder assemblies according to the invention) are arranged so that their central axes are coincident and opposing. The motion of the pistons for the system of FIG. 10 is controlled by their power conversion electronics such that the corresponding pistons move in synchronism in exactly equal and opposite movements. Thus, the two piston assemblies 1003/1005 move toward or away from each other at exactly the same speed, and likewise the two piston assemblies 1004 move toward (or away from) each other in synchronism. The upper end zone 1015 is common to both sides of the engine, while there is a separate lower end zone 1016 at each end. Such an arrangement may be referred as an engine with "horizontally opposed" cylinders; or more generally, "axially opposed" cylinders, since the common axis need not necessarily be horizontal. A horizontal placement may have advantages for arrangement of the flow of combustion gases past the heating zones.

In FIGS. 11A and 11B, four of the cylinder assemblies of the type shown in FIG. 5A (or any other cylinder assemblies according to the invention) are placed side-by-side so that their central axes are parallel and arranged in a diamond pattern as viewed end-on (shown in FIG. 11B). The controlling power electronics ensures that the pistons in cylinders A and C move together in the same direction and in exact synchronism. The pistons in cylinders B and D also move together in the same direction and in exact synchronism, but in exactly the opposite direction to those in A and C, as indicated by the cross and dot vector notation of FIG. 11B. In order to keep the heating zones in all four cylinders close together, the two pairs of cylinders may need to be displaced axially relative to each other rather than having their ends coplanar.

Figure 13:
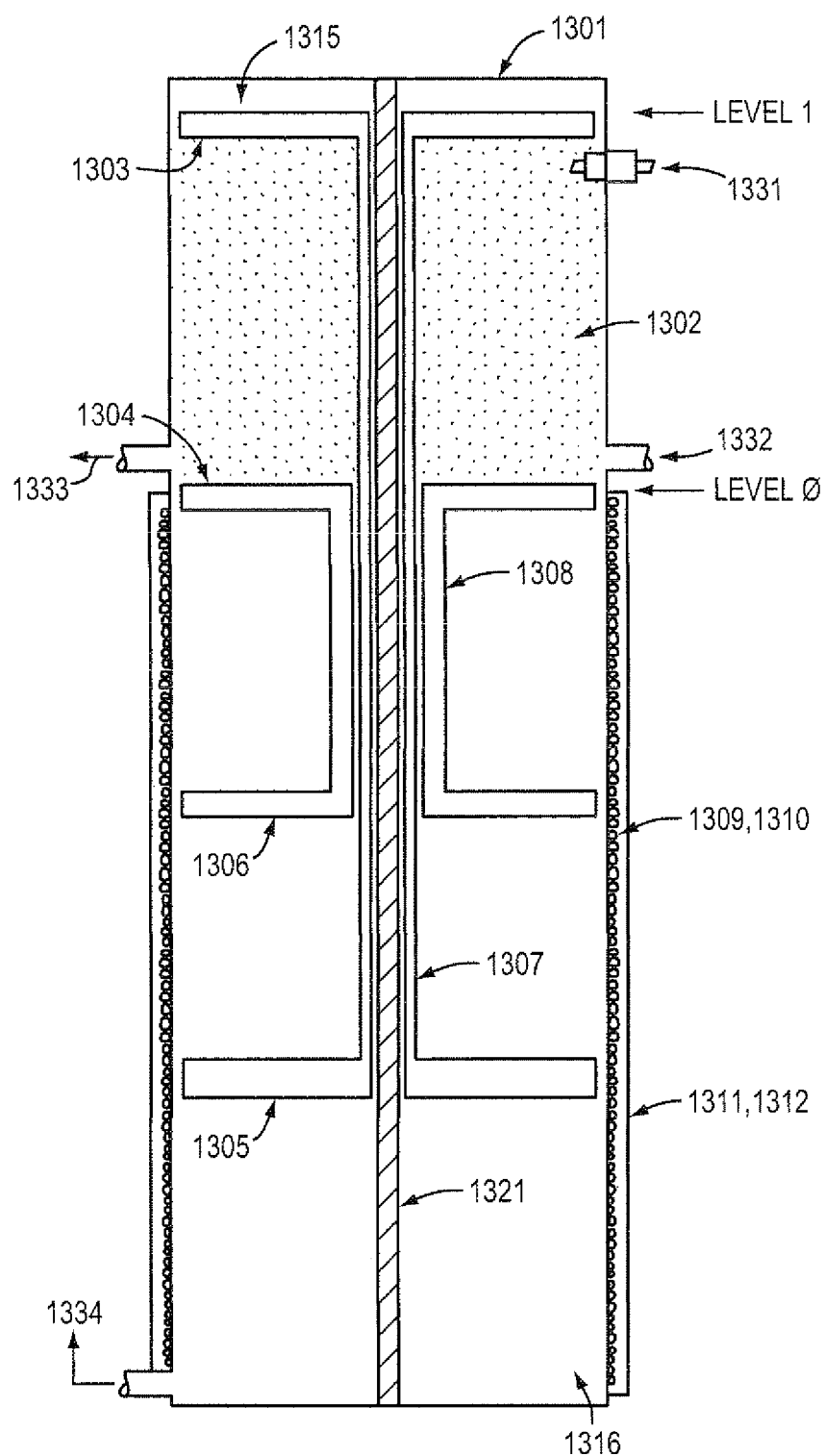
FIG. 13 is a cross-sectional view of a piston arrangement for an internal combustion generator, in accordance with an embodiment of the invention.

The methods described above can be extended to the implementation of an internal combustion generator, in accordance with an embodiment of the invention. In a similar fashion to that described for FIGS. 3A-4, the electrical arrangement of FIG. 4 may be used to perform cyclical energy storage for a mechanical piston arrangement of an internal combustion cycle. FIG. 13 is a cross-sectional view of one possible such mechanical arrangement, which can be seen to incorporate features already explained with reference to FIGS. 3A, 5A, and 9. In FIG. 13, two concentric piston assemblies 1303 and 1304 surround a centering shaft 1321 in a cylinder 1301, as in FIG. 9. An arrangement corresponding to FIG. 3A could also be implemented, wherein the piston assemblies are physically separate, with or without a centering shaft. In FIG. 13, a fuel/air mixture is fed into the working gas region 1302 via an inlet valve and port 1332, and an outlet valve and port 1333 allows for exhaust gas to be ejected. A spark plug 1331 is located at the upper end of the working gas region 1302. The walls of the working gas region 1302 are thermally insulated, and are made strong enough to withstand the forces associated with ignition of the fuel/air mixture. Other features may be similar to those described above, including concentric shafts 1307 and 1308, permanent magnet plates 1305 and 1306, drive windings 1309 and 1310, magnetic field return paths 1311 and 1312, and end zones 1315 and 1316. Exhaust port 1334 provides a means of escape for gas in region 1316, so that excessive compression forces are not required to compress the gas in region 1316.

Figure 14:
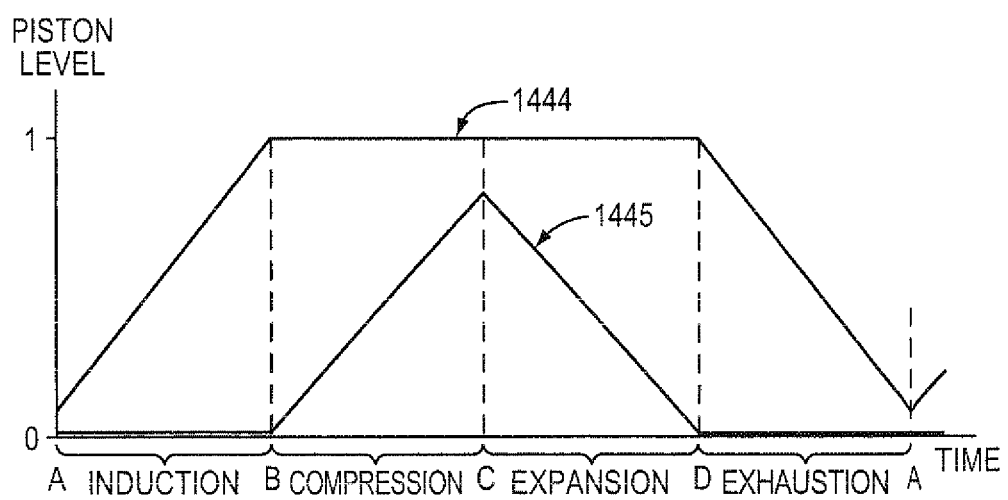
FIG. 14 is a timing diagram for an internal combustion generator, in accordance with an embodiment of the invention.
Figure 15:
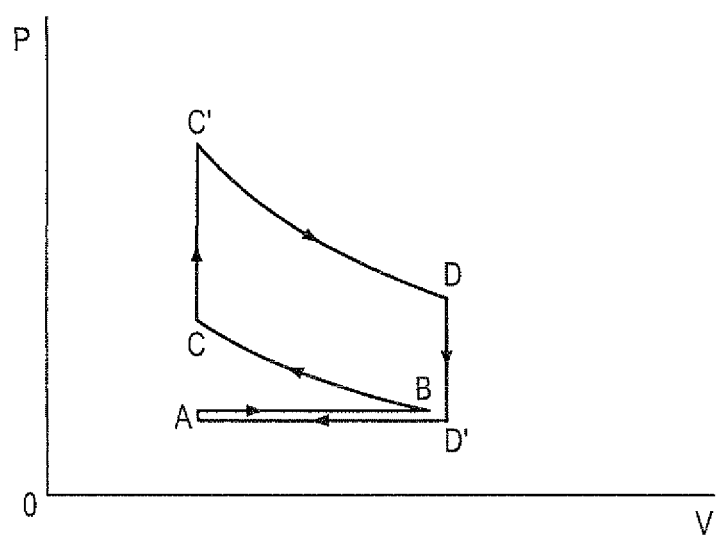
FIG. 15 is a P-V diagram of an Otto cycle by which an internal combustion generator may be operated, in accordance with an embodiment of the invention.

FIG. 14 shows a timing diagram that the internal combustion generator of FIG. 13 may follow while performing an Otto cycle shown in the P-V diagram of FIG. 15, in accordance with an embodiment of the invention. Curve 1444 is the piston position profile for piston 1303, and curve 1445 is the piston position profile for piston 1304, for a repeating cycle A-B-C-D-A. The piston positions are indicated by position levels 0 and 1 on the y-axis of FIG. 14, which correspond to cylinder positions indicated in FIG. 13.

Between times A and B of FIGS. 14 and 15, the inlet valve 1332 of FIG. 13 is open, allowing a fuel/air mixture to be drawn into the working gas region 1302 as piston 1303 is moved from position Level 0 to Level 1 (curve 1444). During this segment, piston 1304 is held at position Level 0 (curve 1445). The motion of piston 1303 for this segment is depicted as having a straight-line shape (curve 1444), although in practice the motion may be nonlinear.

Between points B and C of FIGS. 14 and 15, the working gas 1302 is compressed as piston 1304 is moved from position Level 0 to Level 1 (curve 1445), while piston 1303 remains at Level 1 (curve 1444). At point C, spark plug 1331 initiates combustion of the working gas 1302, at which time the pressure of the working gas 1302 jumps immediately to the higher level shown at C' in the P-V diagram of FIG. 15.

Between points C and D of FIGS. 14 and 15, the working gas 1302 expands, exerting mechanical force on the pistons, and forcing piston 1304 downward (curve 1445) while piston 1303 remains at position Level 1 (curve 1444). Again, the motion of piston 1304 for this segment is depicted as having a straight-line shape, although in practice the motion may be nonlinear. At point D, exhaust valve 1333 is opened, at which time the pressure of the working gas 1302 falls immediately to the lower level shown at D' in the P-V diagram.

Between points D and A of FIGS. 14 and 15, the exhaust valve 1333 remains open, and the burnt working gas 1302 is ejected as piston 1303 is moved from position Level 1 to Level 0 (curve 1444), while piston 1304 remains at Level 0 (curve 1445).

It can therefore be seen that embodiments according to the invention provide a variety of different possible ways of using electrical storage of the cyclical energy required by a thermal cycle, including external and internal combustion generators, and electrically-driven heat pumps.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for generating electrical energy using a thermal cycle of a working gas, the method comprising:
using the motions of a first permanent magnet attached to a first piston in a cylinder and a second permanent magnet attached to a second piston in the cylinder, the cylinder containing the working gas performing the thermal cycle, to electromagnetically induce current in a set of windings of an electrical circuit coupled to the cylinder, the electrical circuit comprising an electronic power converter;
using compression and expansion of the working gas between the first piston and the second piston to perform the thermal cycle;
using the electrical circuit to store the electrical energy, produced by the current induced in the electrical circuit, in an electrical storage device; and
using the electrical energy stored in the electrical storage device to electromagnetically provide motive force to the first piston and the second piston;
using the electronic power converter to perform closed-loop electronic control of the motions of the first piston and the second piston;
the cyclically using the electrical circuit to store the electrical energy and using the stored energy to provide motive force to the first piston and the second piston effecting a net positive average power transfer into the electrical storage device over the course of the thermal cycle;
the working gas receiving heat from an external heat source thermally coupled to the cylinder through at least one heat transfer zone of the cylinder; and
at least part of a shaft of the first piston moving concentrically within a shaft of the second piston.

2. A method for generating electrical energy using a thermal cycle of a working gas, the method comprising:
using the motion of a piston in a first cylinder, containing the working gas performing the thermal cycle, to electromagnetically induce current in an electrical circuit coupled to the first cylinder, the electrical circuit comprising an electronic power converter;
using the electrical circuit to store the electrical energy, produced by the current induced in the electrical circuit, in an electrical storage device; and
using the electrical energy stored in the electrical storage device to electromagnetically provide a motive force to the piston;
using the electronic power converter to perform closed-loop electronic control of the motion of the piston;
the cyclically using the electrical circuit to store the electrical energy and using the stored energy to provide a motive force to the piston effecting a net positive average power transfer into the electrical storage device over the course of the thermal cycle;
the method further comprising using a second cylinder, a third cylinder, and a fourth cylinder, each operating according to the same method used for the first cylinder to generate electrical energy, the first cylinder, second cylinder, third cylinder, and fourth cylinder being operated in a bundle with parallel axes of the cylinders, two of the cylinders being operated antiparallel to the other two cylinders of the first cylinder, second cylinder, third cylinder, and fourth cylinder.

3. A method for powering a heat pump using electrical energy, the heat pump performing a thermal cycle, the method comprising:
using electrical energy stored in an electrical storage device to electromagnetically provide motive force to a first piston in a cylinder and a second piston in the cylinder, the cylinder containing the working gas performing the thermal cycle;
using the motions of a first permanent magnet attached to the first piston and a second permanent magnet attached to the second piston to electromagnetically induce current in a set of windings of an electrical circuit coupled to the cylinder, the electrical circuit comprising an electronic power converter;
using compression and expansion of the working gas between the first piston and the second piston to perform the thermal cycle; and
using the electrical circuit to store the electrical energy, produced by the current induced in the electrical circuit, in the electrical storage device;
using the electronic power converter to perform closed-loop electronic control of the motions of the first piston and the second piston;
the cyclically using the stored energy to provide motive force to the first piston and the second piston and using the electrical circuit to store the electrical energy effecting a net positive average power transfer out of the electrical storage device over the course of the thermal cycle;
the working gas delivering heat to an external heat source thermally coupled to the cylinder through at least one heat transfer zone of the cylinder; and at least part of a shaft of the first piston moving concentrically within a shaft of the second piston.

4. A method for powering a heat pump using electrical energy, the heat pump performing a thermal cycle, the method comprising:
using electrical energy stored in an electrical storage device to electromagnetically provide a motive force to a piston in a first cylinder containing the working gas performing the thermal cycle;
using the motion of the piston to electromagnetically induce current in an electrical circuit coupled to the first cylinder, the electrical circuit comprising an electronic power converter; and
using the electrical circuit to store the electrical energy, produced by the current induced in the electrical circuit, in the electrical storage device;
using the electronic power converter to perform closed-loop electronic control of the motion of the piston;
the cyclically using the stored energy to provide the motive force to the piston and using the electrical circuit to store the electrical energy effecting a net positive average power transfer out of the electrical storage device over the course of the thermal cycle;
the method further comprising using a second cylinder, a third cylinder, and a fourth cylinder, each operating according to the same method as the first cylinder to power a heat pump using electrical energy, the first cylinder, second cylinder, third cylinder, and fourth cylinder being operated in a bundle with parallel axes of the cylinders, two of the cylinders being operated antiparallel to the other two cylinders of the first cylinder, second cylinder, third cylinder, and fourth cylinder.

5. A method according to claim 1, wherein the at least one heat transfer zone of the cylinder comprises a heating zone of the cylinder and a cooling zone of the cylinder, the method further comprising using the motions of the first piston and the second piston to move the working gas along the cylinder to effect successive heat transfer of the working gas across the wall of the heating zone of the cylinder and across the wall of the cooling zone of the cylinder, the motions of the first piston and the second piston moving the working gas successively past and away from each of the heating zone of the cylinder and the cooling zone of the cylinder, the working gas being constrained by the motions of the first piston and the second piston from directly transferring heat between the heating zone of the cylinder and the cooling zone of the cylinder when the working gas is moved past and away from each of the heating zone of the cylinder and the cooling zone of the cylinder.

6. A method according to claim 1, wherein the electronic power converter performs the closed-loop control based on electrical signals related to the state of the working gas.

7. A method according to claim 6, further comprising:
using at least one of a temperature sensor, a pressure sensor, and a position sensor to deliver the electrical signals related to the state of the working gas to the electronic power converter.

8. A method according to claim 1, further comprising:
using the electronic power converter to control timing of the thermal cycle by controlling the motions of the first piston and the second piston.

9. A method according to claim 8, wherein the at least one heat transfer zone of the cylinder comprises a heating zone of the cylinder, a cooling zone of the cylinder and a neutral zone of the cylinder, the method further comprising:
using the electronic power converter to control the motions of the first piston and the second piston such that the working gas moves between the heating zone of the cylinder, the cooling zone of the cylinder, and the neutral zone of the cylinder.

10. A method according to claim 1, wherein the thermal cycle approximates a Sterling cycle.

11. A method according to claim 1, wherein the thermal cycle approximates a Carnot cycle.

12. A method according to claim 1, further comprising:
using a mechanical hard stop to hold at least one of the first piston and the second piston in place during a stationary portion of the thermal cycle.

13. A method according to claim 12, wherein the mechanical hard stop is selected from the group consisting of a mechanical barrier, a permanent magnet and a magnetic pole, the mechanical hard stop being attached to at least one of the cylinder, the first piston and the second piston.

14. A method according to claim 3, wherein the at least one heat transfer zone of the cylinder comprises a heating zone of the cylinder and a cooling zone of the cylinder, the method further comprising using the motions of the first piston and the second piston to move the working gas along the cylinder to effect successive heat transfer of the working gas across the wall of the heating zone of the cylinder and across the wall of the cooling zone of the cylinder, the motions of the first piston and the second piston moving the working gas successively past and away from each of the heating zone of the cylinder and the cooling zone of the cylinder, the working gas being constrained by the motions of the first piston and the second piston from directly transferring heat between the heating zone of the cylinder and the cooling zone of the cylinder when the working gas is moved past and away from each of the heating zone of the cylinder and the cooling zone of the cylinder.

15. A method according to claim 3, wherein the electronic power converter performs the closed-loop control based on electrical signals related to the state of the working gas.

16. A method according to claim 15, further comprising:
using at least one of a temperature sensor, a pressure sensor, and a position sensor to deliver the electrical signals related to the state of the working gas to the electronic power converter.

17. A method according to claim 3, further comprising:
using the electronic power converter to control timing of the thermal cycle by controlling the motions of the first piston and the second piston.

18. A method according to claim 17, wherein the at least one heat transfer zone of the cylinder comprises a heating zone of the cylinder, a cooling zone of the cylinder and a neutral zone of the cylinder, the method further comprising:
using the electronic power converter to control the motions of the first piston and the second piston such that the working gas moves between the heating zone of the cylinder, the cooling zone of the cylinder, and the neutral zone of the cylinder.

19. A method according to claim 3, wherein the thermal cycle approximates a Sterling cycle.

20. A method according to claim 3, wherein the thermal cycle approximates a Carnot cycle.

21. A method according to claim 3, further comprising:
using a mechanical hard stop to hold at least one of the first piston and the second piston in place during a stationary portion of the thermal cycle.

22. A method according to claim 21, wherein the mechanical hard stop is selected from the group consisting of a mechanical barrier, a permanent magnet and a magnetic pole, the mechanical hard stop being attached to at least one of the cylinder, the first piston and the second piston.

* * * * *